United States Patent
Krengel et al.

(10) Patent No.: US 6,762,392 B1
(45) Date of Patent: Jul. 13, 2004

(54) LIFT-AND-STRIKE WELDING PROCESS WITH CLEANING STAGE

(75) Inventors: Michael Krengel, Giessen (DE); Haymo Gottwals, Muecke (DE); Klaus Gisbert Schmidt, Giessen (DE); Reinhold Broehl, Staufenberg (DE); Wolfgang Schmidt, Reiskirchen (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 09/980,169

(22) PCT Filed: May 5, 2000

(86) PCT No.: PCT/GB00/01727

§ 371 (c)(1), (2), (4) Date: Jan. 9, 2002

(87) PCT Pub. No.: WO00/78495

PCT Pub. Date: Dec. 28, 2000

(30) Foreign Application Priority Data

Jun. 5, 1999 (DE) .......................... 199 25 628

(51) Int. Cl.⁷ ............................... B23K 9/20
(52) U.S. Cl. ................... 219/99; 219/98; 219/130.5
(58) Field of Search ............. 219/74, 75, 98, 219/99, 130.4, 130.5

(56) References Cited

U.S. PATENT DOCUMENTS

| | | | | |
|---|---|---|---|---|
| 3,278,720 A | * | 10/1966 | Dixon | 219/74 |
| 4,434,348 A | * | 2/1984 | Reid | 219/75 |
| 5,171,959 A | | 12/1992 | Schmitt et al. | |
| 5,252,802 A | | 10/1993 | Raycher | |
| 5,317,123 A | | 5/1994 | Ito | |
| 5,321,226 A | | 6/1994 | Raycher | |
| 5,389,761 A | | 2/1995 | Kresse, Jr. | |
| 5,502,291 A | | 3/1996 | Cummings | |
| 5,938,945 A | * | 8/1999 | Hofmann et al. | 219/99 |
| 5,977,506 A | | 11/1999 | von Daniken | |
| 6,215,085 B1 | | 4/2001 | Cummings et al. | |

FOREIGN PATENT DOCUMENTS

| | | | |
|---|---|---|---|
| DE | 4313502 | * | 10/1994 |
| DE | 19524490 | * | 1/1997 |
| GB | 2042956 | * | 10/1980 |

OTHER PUBLICATIONS

International Search Report corresponding to International Application No. PCT/GB00/01727, 2 pages.

* cited by examiner

*Primary Examiner*—Clifford C. Shaw
(74) *Attorney, Agent, or Firm*—Harness, Dickey & Pierce, P.L.C.

(57) ABSTRACT

The present invention relates to a lift-and-strike welding process. In a first step, e.g. an aluminum surfaces (5) of a component is cleaned by striking an arc and then the element (4) to be connected is welded on by means of at least one second voltage. Besides a lift-and-strike welding apparatus, a further lift-and-strike welding process is also provided, wherein an electric cleaning current flows between a surface (5) of a component and an element to be welded thereon, in that the component rests on the surface (5) and then the element (4) is lifted off the surface (5) up to an approximately, in terms of time, constant distance for removing a coating from the surface (5) by means of an arc, then the current changes its polarity, wherein afterwards at least one welding current is produced and then the element (4) is welded to the surface (5).

81 Claims, 3 Drawing Sheets

LIFT-AND-STRIKE WELDING PROCESS WITH CLEANING STAGE

The invention relates to a lift-and-strike welding process as well as to a lift-and-strike welding apparatus. The process and the apparatus are suitable in particular for welding a weld stud onto an aluminium surface or steel sheet surface, which have in each case a surface coating, e.g. a lubricant coating.

A lift-and-strike welding process, in particular a stud lift-and-strike welding process, has the advantage of industrial-scale capability combined with processing reliability with regard to, for example, reliable ignition of an arc. The lift-and-strike welding process is also less noisy than other welding processes. The lift-and-strike welding process is therefore used in numerous fields especially on account of its being economical to operate. Especially in the automobile industry, lift-and-strike welding has become an established technique. Aluminum and aluminum composite components are becoming increasingly popular as materials in the automobile industry on account of their low weight. From DE 195 244 90, for example, a lift-and-strike welding process is known, wherein an aluminum weld stud is welded to a workpiece made of aluminum. In such a process, the height of lift of the weld stud will vary depending upon the measured arc voltage. It is also known from said document that, to prevent a short circuit from being caused by melted material dripping from the weld stud, by reversing the polarity at either the weld stud or the workpiece during the welding operation. It is also known that, by reversing the polarity, the formation of the molten bath may be varied.

The object of the present invention is therefore to provide a lift-and-strike welding process and a corresponding lift-and-strike welding apparatus, with which an element may be welded reliably and with a high quality onto a surface, even if a coating should be disposed on the surface.

The lift-and-strike welding process is such that, as a first step, a surface of a component is cleaned, namely by applying a first voltage so as to strike an arc between a stud to be connected to the surface, and the surface. In a second step, a polarity of the first voltage is reversed. Then the element is welded on by means of at least one second voltage.

This process is particularly suitable for use with both steel sheets and aluminium sheets, which have either an organic or zinc coating. The zinc coating may be electroplated or galvanised or may be Bonazink. The coating may also consist of accumulated dirt or the like. For example, it has proved particularly suitable to use the process for the welding of steel sheets having a sheet thickness of 1 to 0.5 mm and less which has a zinc protection layer, e.g. in the case of hot galvanising, of 70 $\mu$m and less, e.g. also in the case of thin zinc protection layers, of 30 to 3 $\mu$m or even less. The cleaning process is very precisely adaptable to the surface to be cleaned and is also suitable for very thin coatings. There now follows a detailed description of the mode of operation of the invention with reference to a machining of a component made of aluminium. The features described below are however also applicable to the welding of a corresponding steel sheet.

Aluminium components which are cold formed, in particular deep drawn, have a surface coating in the form of a lubricant. Said lubricant prevents cold welding between the aluminium workpiece and a machining tool. The lubricant moreover reduces the friction force which arises. An organic coating, in particular a wax or oil-based coating is often used. By striking a cleaning arc, the effect is achieved that the organically based coating as a result of overheating by the arc volatilises leaving no significant residues, in particular leaving no residue, and/or is displaced from the welding region. The subsequent actual welding operation by means of e.g. a pilot current and subsequent welding current of the lift-and-strike welding process allows the element, which is to be welded on, to be dipped into a weld pool of the aluminium surface which is not contaminated with the previous coating.

For cold-formed aluminium sheets a wax-based lubricant coating is customary. During an arc welding process, the wax releases hydrogen which would bond with the molten aluminium during the welding operation. The moment the molten aluminium hardens again, the ability of the aluminium to bond with the released hydrogen is lost. The hydrogen is exhaled and leaves behind a high porosity in the region of the joint zone. Said porosity leads to an enormous deterioration of the welding quality. Through use of the aluminium lift-and-strike welding process it is possible to avoid a poor welding quality. The process also allows its users to dispense with previous cleaning of the aluminium components used. Cold deep-drawn sheets, for example, prior to subsequent welding previously had to be sent through a washing lane in order to prepare the surface of the aluminium sheets for the welding process. Said cleaning operation is now no longer necessary. As a result, aluminium-containing components having a coating may even without basic preliminary cleaning be reliably welded e.g. with a weld stud. The quality of the weld joint therefore depends on the ambient conditions in the joint zone which are created by the cleaning arc, wherein the surface is advantageously rendered dry and metallically pure.

It is advantageous when, after the first step of applying the cleaning voltage, in a second step a polarity of the first voltage is reversed. By said means the cleaning may be influenced by altering the arc. It is further advantageous when, after the first voltage used as a cleaning voltage has dropped, the actual lift-and-strike welding process ensues after a specific period of time. The process is improved by reversing the polarity between the first and subsequent second voltage. Said reversal is effected preferably in the period of time, during which the first voltage has dropped, in particular to zero. In said case, during the cleaning phase a positive polarity is preferably adjusted for the first voltage. This means that at the aluminium surface of the component there is a negative potential, while the weld-on element has a positive potential. It is therefore possible to heat the aluminium sheet up to temperatures at which the coating is volatilised. The aim is in particular to clean a region of the surface which, for example, approximately corresponds to, or is optionally slightly smaller or slightly larger than, the subsequent joint zone. Given use of a weld stud, the aim is to achieve a circular cleaned surface having a diameter which preferably corresponds to the diameter of the weld stud. Given a different geometry of the weld-on component, e.g. an oval or angular cross section, the cleaned surface is advantageously of a corresponding sise. This is assisted by a polarity of the type described above. For the subsequent welding operation a negative polarity is preferably selected. A negative polarity during the cleaning operation might give rise to the problem of rust particles arising and/or remaining in the region of the surface to be cleaned.

The first voltage is moreover preferably set higher, in terms of its magnitude, than the immediately following voltage of reverse polarity. It is set, for example, by appropriate adjustment of the height to which the weld-on element is lifted above the surface. By increasing the distance, the voltage may likewise be increased while the current intensity, for example, remains constant. This enables a requisite energy density to be produced for the cleaning operation while, e.g. given use of a subsequent pilot current for the lift-and-strike welding process with reverse polarity, the aluminium surface is heated up and the arc stabilised in such a way that a weld pool of suitably required depth is produced when the subsequent welding voltage is applied.

The application of a first cleaning voltage may be effected separately from a subsequent application of a pilot welding voltage. For reversal of the polarity of the arc, it is advantageous when the polarity is reversed when the first voltage reaches a zero value. For said purpose, the zero value is advantageously maintained for a short time. Said voltage-free time is provided, for example, when the weld-on element is being moved in the direction of the surface. It is only after said time that a second voltage, e.g. a pilot voltage, is built up. For said purpose, the weld-on element is situated, after the cleaning operation, back in contact with the surface. By lifting the element off the surface, the welding arc e.g. in the form of a pilot arc is then ignited. Said machining steps are however preferably combined with one another. As a result, the machining time of a component is reduced. According to a development, said time reduction is achieved in that a drop of the first voltage is immediately followed by the welding process preferably using a pilot voltage and subsequent welding voltage, wherein the last two voltages have a different polarity to the fist voltage. In said manner, a reliable ignition of the arc after the polarity reversal is possible.

The possibility moreover exists of applying the welding voltage directly after the first voltage and the subsequent polarity reversal.

A second aluminium lift-and-strike welding process is further provided. Said process may, for example, be combined with the first aluminium lift-and-strike welding process. The second aluminium lift-and-strike welding process comprises the following steps:

an electric cleaning current flows between an aluminium surface of a component and an element to be welded thereon, in that the component rests on the aluminium s and then the element is lifted off the aluminium surface up to an approximately, in terms of time, constant distance for removing a coating from the aluminium surface through ignition of an arc as a cleaning agent, then the current changes its polarity, wherein afterwards at least one welding current is produced and then the element is welded to the aluminium surface.

The particular effect realised with said process is that during reversal of the polarity the current continues to flow between the surface and the element to such an extent that, despite the polarity reversal, the arc does not collapse. The element need not therefore be brought back into contact with the surface for ignition of the arc.

Preferably a cleaning current is used, which assumes a current intensity of between 15 and 120 amperes, in particular 500 amperes, before it drops. Said cleaning current intensity is sufficient for complete removal of the coating, which is situated e.g. on one aluminium surface, by means of the arc. In said case, the duration of the cleaning operation may be influenced by the level of the current intensity: the higher the arc current, the shorter the duration of the cleaning operation. The cleaning current intensity is however preferably set low enough to prevent a weld pool area from starting to form on the aluminium surface. The temperature is taken into account in such a way that there is, in particular, not yet any melting of material during the cleaning operation. This is simultaneously regulated or controlled e.g. likewise by the duration of the effective cleaning current intensity. It has moreover proved advantageous when after a reversal of the polarity an, in terms of its magnitude, maximum current is produced. Said current is then the welding current which ensures the formation at the aluminium surface of a weld pool of corresponding molten material, into which the element to be connected, e.g. an aluminum stud with a melted end face, is subsequently dipped. Preferably, the element is brought back into contact with the aluminium surface only after disconnection of the welding current. In particular, such a time delay is observed, that the weld pool has become doughy again but nevertheless still retains its bonding capacity.

According to a development of the aluminium lift-and-strike welding process, the cleaning current lasts approximately as long as or longer, in particular at least 3 times longer, than a pilot current flowing prior to the welding current. It is further advantageous when the welding current is equal to or stronger, in particular at least 1.2 times stronger, than the cleaning current. The injection of power into the workpiece achieved in each case thereby is therefore appropriate to the respective objectives of the individual process steps. The maximum power injection is effected during the actual welding operation and a power injection for cleaning purposes, which is adapted to the respective coating of the aluminium surface, is accordingly lower.

The nature of the power injection may moreover also be regulated by means of the durations. This is dependent, on the one hand, upon the type of coating and, on the other hand, upon the thickness of the coating. In particular, the volatilising of the coating is recorded by a suitable apparats and used as the basis for adjusting, e.g. regulating or controlling, a power injection by means of the cleaning current or the cleaning voltage. This also enables later evaluation of corresponding parameters of the cleaning operation for a subsequent quality inspection, e.g. while also taking into account parameters of the subsequent welding operation. Volatilising of the coating is measurable, for example, through a variation of the arc voltage or the current. Through measurement of a suitable parameter, the duration of the cleaning step may also be regulated so that, given a corresponding variation of the measured value, e.g. of the voltage, the cleaning operation is terminated, the polarity is reversed and the welding process ensues. When, for example, the surface is being cleaned to remove an organic coating containing hydrogen, a voltage drop of the arc voltage is to be observed once the hydrogen, which is to be removed, has been removed. A corresponding lift-and-strike welding apparatus therefore comprises, for example, a suitable measuring, regulating and/or control device which provides appropriate functions. Such an apparatus also comprises a suitable evaluation device e.g. with a suitable memory etc.

It has further proved advantageous when the element, during cleaning of the aluminium surface, assumes a distance from the aluminium surface which is at least 2 times greater than the distance from the aluminium surface particularly when a pilot current flows prior to the welding current. It is therefore possible, on the one hand, to clean a larger area of the aluminium surface. On the other hand, the possibility exists of using a variation of the distance to adapt the intensity of the cleaning in accordance with the respective coating without having a negative effect upon the base material.

Besides the previously described features, the measures for controlling and/or regulating the weld stud which are known from DE 195 244 90 are moreover also applicable for effecting both the steel sheet and the aluminium lift-and-strike welding process. In particular, it has proved advantageous to use, for welding-on, stud geometries of the type disclosed in DE 196 11 711.

An aluminium lift-and-strike welding apparatus is further provided in the present invention. The apparatus comprises a guide for a weld-on element and a control device for the guide. The guide is, for example, a welding head, a welding gun or a housing for fixing and lifting the weld-on element. The apparatus further comprises a device for controlling or regulating the electric current and/or the voltage used for welding, wherein the apparatus has a polarity reversing means for the voltage used for welding. The device for controlling or regulating the electric current and/or the voltage is programmed or designed so as to produce, prior to the welding operation, a cleaning current which has a reverse polarity relative to the welding current. The apparatus may be used in particular to effect a process in accordance with the above description.

The invention further provides a polarity reversing means for a lift-and-strike welding apparatus, The polarity reversing means comprises a circuit element which produces an arc current during the reversal of the polarity, in particular in the form of a circuit acting as a reactor in order to maintain a struck arc during a reversal of the polarity of the arc voltage. The polarity reversing means advantageously comprises a first and a second power source, wherein the first power source supplies a cleaning current and the second power source supplies a welding current. A coil is advantageously connected to the first and the second power source in such a way that a struck arc continues to be maintained during reversal of the polarity. An extinction of the arc is therefore prevented when the current passes through zero.

Further advantageous refinements and developments as well as features of the invention are illustrated in greater detail in the following drawings, in which.

Figure 1:
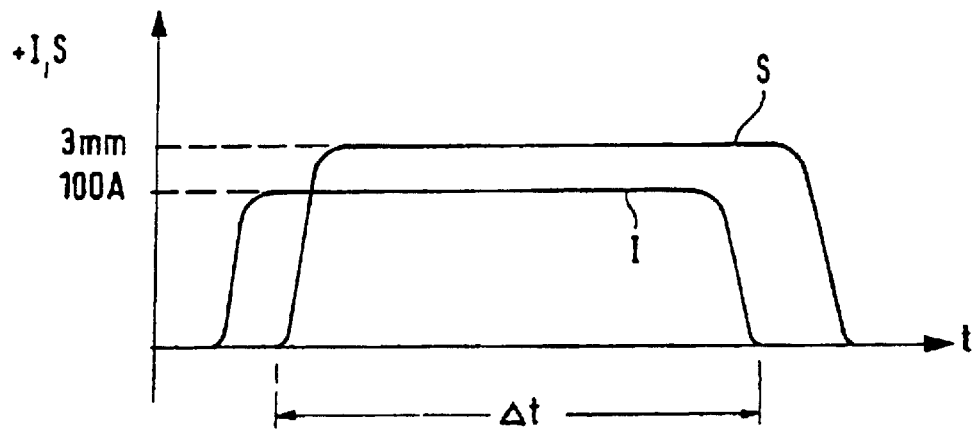
FIG. 1 shows a characteristic of a distance S and of an electric cleaning current I in a first step of the lift-and-strike welding process of the present invention.

FIG. 1 is a diagram illustrating a possible first step as a cleaning step of the process sequence of the welding process. A current intensity I and a distance S are plotted along the y-axis. The distance S is the distance between the weld-on element and an exemplary aluminium surface. The time coordinate is plotted along the x-axis. In the first step, the weld-on element is situated in contact with the aluminium surface. The current intensity I is switched on. A flow of current occurs between aluminium surface and the element. The cleaning current being injected is preferably adjusted to a magnitude of between 20 and 500 amperes. Said clearing intensity is preferably held approximately constant also for a specific period of time. After a short time delay after switching on the current intensity I, the element is lifted off the aluminium surface and preferably moved up to an approximately constant distance S. The cleaning current intensity is kept constant and the arc voltage arises in accordance with the distance S and the degree of cleaning. The distance S is advantageously approximately 3 mm for an aluminium weld stud. After a duration $\Delta t$, which starts with lifting of the element from the aluminium surface and ends with the dropping of the cleaning current intensity to zero ampere, the aluminium surface is cleaned. The duration $\Delta t$ is preferably set between 15 ms and 120 ms. The advantage of said cleaning is that the cleaned remains limited at least to approximately the weld pool area subsequently required. When, for example, there is provided on the aluminium surface a coating which is to be retained also in the subsequent workpiece, e.g. a protective coating, the process offers the advantage of having removed the coating only in the region of the welding zone. The distance S is in particular adjusted in such a way that the arc which arises is focused on the aluminium surface and so the surface to be cleaned remains limited. Preferably, such a focusing of the arc is adjusted by means of a suitable guide for the weld-on element. Alternatively, the welding apparatus may have a suitable focusing device which is, for example, integrated with the guide. According to one construction of a suitable welding apparatus, use is made for said purpose of a guide comprising a collet, around which an a.c.-operated magnet coil is disposed. By said means it is possible to prevent a dispersion of the arc as a result of blowout. The fist step is followed by the polarity reversal as a second step, which is not shown in detail.

Figure 2:
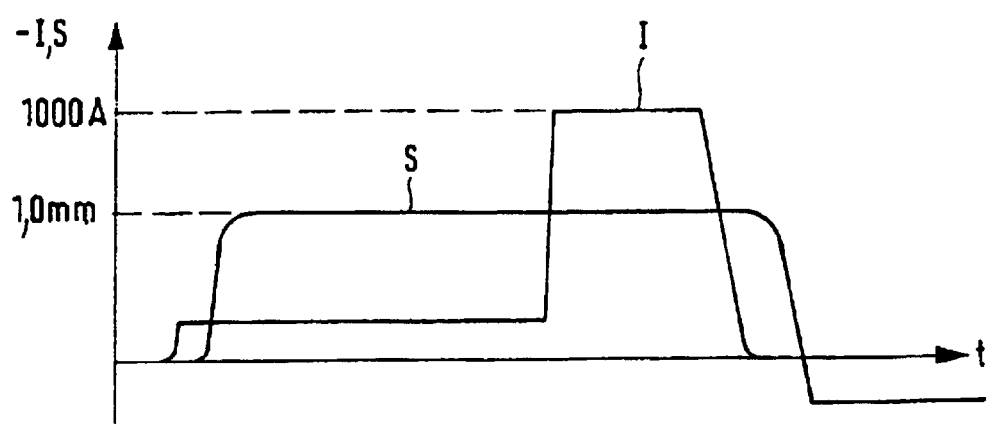
FIG. 2 shows the characteristic of the distance S and of the electric current I in a welding step as a third step of the process of the present invention.

FIG. 2 shows a third step of the process which comes after the first step of FIG. 1 and the second step, namely the subsequent polarity reversal. The polarity reversal is evident from the change of the sign of the current intensity. Preferably, a change from positive to negative occurs. According to a development, the weld-on element remains in the lifted position, e.g. 3 mm up, for a specific period of time. This allows any material of the aluminium surface and also possibly of the surface of the element itself which has already melted to harden again. For example, 10 to 80 ms, preferably up to 30 ms after disconnection of the current intensity, the lift e.g. by means of a coil is switched off and the element comes back into contact with the aluminium surface. From said point on, the third step in FIG. 2 begins. Reversal of the polarity from positive to negative in the second step is followed by the start of a lift-and-strike welding process. For example, an arc is ignited by a pilot current, which provides for a stabilising of the welding current. For said purpose the weld-on element, which has been back in contact with the aluminium surface, is removed once more from the surface. According to the diagrammatic embodiment, the distance S then remains once more substantially constant. After a specific period, which lasts longer than the actual welding current duration, the pilot current is increased to a welding current e.g. to 1000 amperes or more. During application of the welding current, the aluminium surface is melted to such an extent that an adequate pool depth is provided. After the welding current has dropped to 0 ampere, there is additionally a specific waiting period to allow the aluminium pool to become doughy. Only then is the element to be welded dipped into the surface and the weld joint produced. An implementation of the process in the manner shown in FIG. 1 and FIG. 2 has the advantage of a precisely predetermined pattern. By linking the steps to one another, the machining time is simply added up. This may lead to somewhat longer retention times in the machining station, e.g. of 300 ms and more. Said time is also dependent inter alia upon how much time the reversal of the polarity takes. The reversal preferably takes no longer than 200 ms. A development therefore provides that the first step of FIG. 1 and the third step of FIG. 2 be combined with one another. This is explained in greater detail below.

Figure 3:
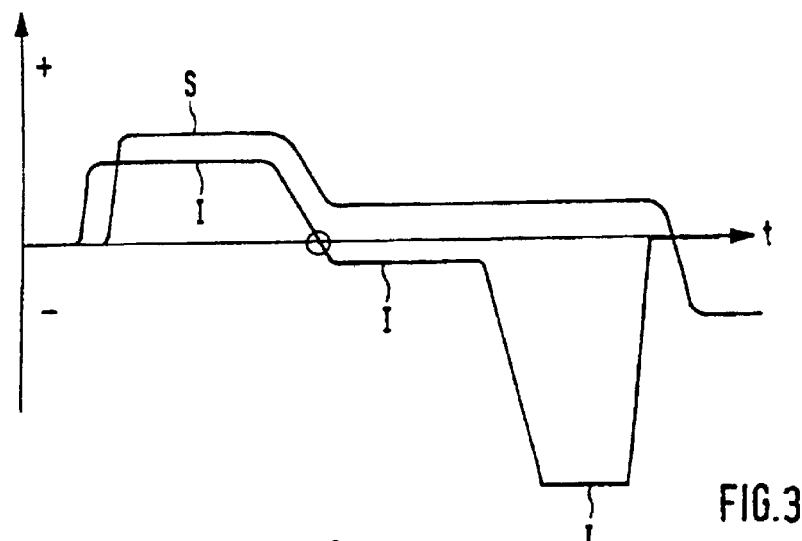
FIG. 3 shows a development in the form of a combination of the first step, a second step and the third step of the present invention.

FIG. 3 shows a combination of the first, second and third steps of FIG. 1 and FIG. 2 in the form of a combination of the process steps without contact of the weld-on element between cleaning and welding. A reversal of the polarity of the current is effected without the weld-on element in the meantime coming into contact with the aluminium surface. Rather, the cleaning current I is converted by reversal of the polarity into a pilot current of the welding process. Said reversal is effected by suitable adaptation of the decrease of the cleaning current intensity up to the passage through zero. After the passage through zero, the current intensity with a negative polarity, indicated by the minus sign in FIG. 3, is controlled or adjusted to a suitable current magnitude of a pilot current. Then the maximum welding current ensues. Compared to the individual steps as they emerge from FIG. 1 and FIG. 2, the machining time is only an insignificant amount, e.g. about 100 ms, longer than a conventional lift-and-strike welding process.

Tests have shown that, with the following values, particularly good welding results have been achieved for an aluminium surface in combination with an aluminium stud:

| | |
|---|---|
| cleaning current intensity: | 15–500 amperes |
| cleaning period: | 20–100 ms |
| distance S for duration of cleaning: | 2.5–3.5 mm |
| pilot current intensity: | 15–25 amperes |
| duration of pilot current intensity: | 0–8 ms |
| distance S for duration of pilot current: | 0.6–1.4 mm |
| welding current intensity: | 500–1500 amperes |
| duration of welding current: | 8–100 ms |
| distance S for duration of welding current: | 1.4 down to 0.6 mm |

Figure 4:
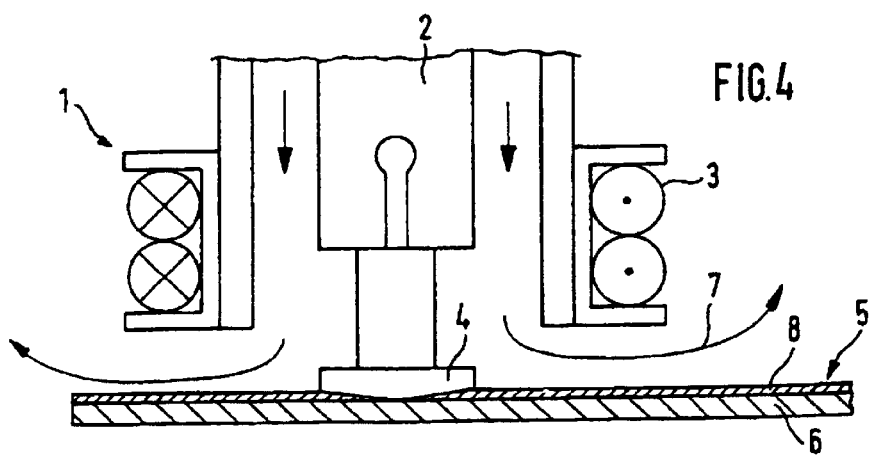
FIG. 4 shows an embodiment of an apparatus for implementing the process of the present invention.

FIG. 4 shows the diagrammatic view of an apparatus 1 for implementing the lift-and-strike welding process. The apparatus 1 comprises a collet 2, around which a coil 3 is disposed. By means of the collet 2 a weld-on element 4, in the present case an aluminium weld stud, is guided onto an aluminium surface 5 of an aluminium sheet 6. During the welding operation an inert gas, e.g. argon, flows around the element 4. The inert gas is indicated by the arrows 7 which surround the element 4. Alternating current flows through the coil 3. The alternating current is controlled and/or regulated so that it influences the arc and the arc shape in such a way that the coating 8 on the aluminium surface 5 is removed only in the region where a welding with the element 4 also later occurs. The coil 3 is preferably operated with an alternating current of between 8 and 30 volts. A current intensity of between 0.1 and 2 amperes is advantageously used. The number of turns as well as the cross section of the coil turn are material-dependent. The coil is in particular selected so as to be capable of bringing the arc very close in to the axial magnetic field and not into the stray field. The stray field would produce a rotating arc, while the axial magnetic field is capable of focusing the arc symmetrically around the axial axis of the stud.

Figure 5:
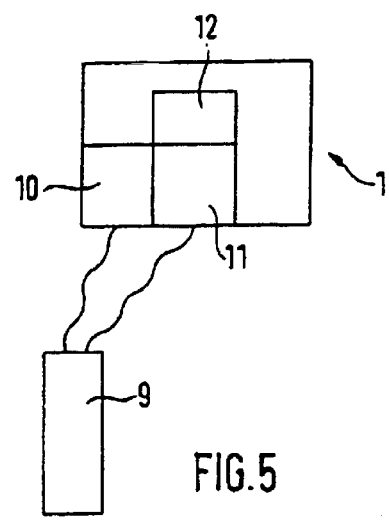
FIG. 5 shows a sketch of a diagrammatic embodiment of an apparatus for implementing the process of the present invention.

FIG. 5 shows a diagrammatic view of the lift-and-strike welding apparatus. By means of a guide 9 a weld-on element (not shown in detail) may be guided onto an aluminium component (not shown). The apparatus further comprises a control device 10 or regulator for the guide 9. The apparatus 1 likewise comprises a device 11 for controlling or regulating the electric current and/or the voltage used for welding as well as a polarity reversing means 12 constructed e.g. by means of thyristors. The device 11 is programmed or operated in such a way as to produce, prior to a welding operation, a cleaning current which has a reverse polarity compared to the welding current. The reversal of the polarity is effected by means of the polarity reversing means 12. The lift-and-strike welding apparatus 1 may be used in particular to produce an aluminium surface with a welded-on element, wherein the aluminium surface has or has had a coating, in particular a lubricant coating.

Figure 6:
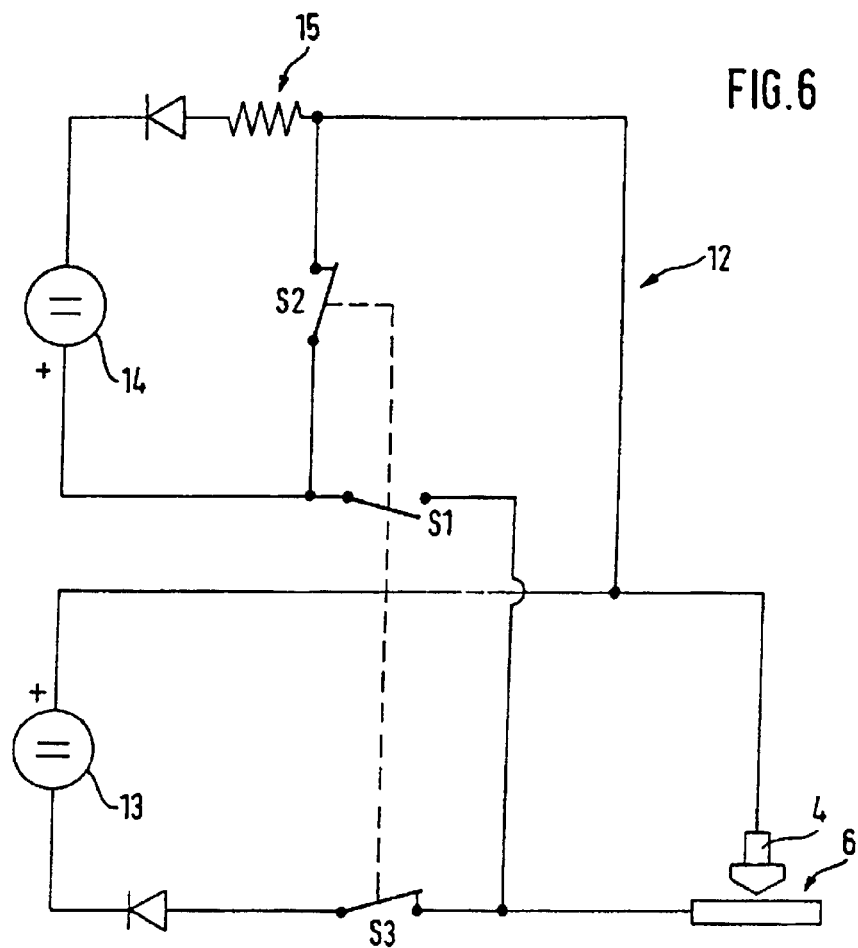
FIG. 6 shows a circuit diagram of a polarity reversing device of the present invention.

FIG. 6 shows an exemplary circuit diagram of a polarity reversing means 12. A first 13 and a second 14 power source are connected in parallel. Both power sources 13, 14 here are constant-current sources. The first power source 13 supplies a current for cleaning and builds up a positive polarity: whereas the stud has a positive potential, the sheet 6 has a negative potential. This is indicated by the plus sign. The second power source 14 supplies a current for the welding step and hence for the pilot current and the actual welding current. The second power source 14 comprises a shorted circuit, which is activated by a closed switch S2. When the polarity reversal is initiated, the second power source 14 operates in the short circuit and injects a current into a reactor 15. The cleaning current produced by the first power source 13 is then reduced towards zero. Before the cleaning current reaches zero, the shorted circuit switch S2 is opened and the welding circuit switch S1 is closed. The injected current in reactor 15 flows into the welding circuit. It prevents extinction of the arc when the current passes through zero. The switch S3 is opened and the first power source 13 is decoupled from the welding circuit.

Figure 7:
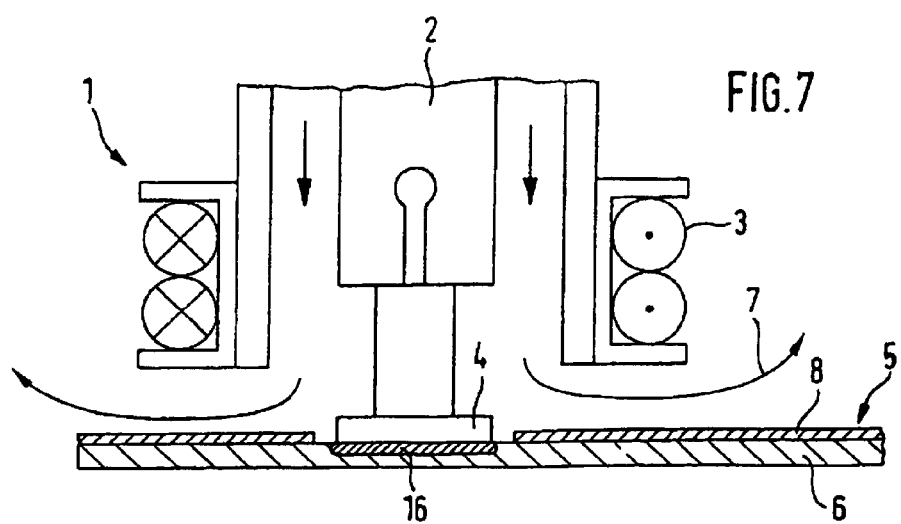
FIG. 7 shows a stud welded on a sheet having a coating.

FIG. 7, in a view corresponding to FIG. 4, shows a stud 4 now welded on a sheet 6 having a coating 8 on the surface. In the region of a joint zone 16 the coating 8 is no longer provided. It has been removed during the cleaning step in the region of connection of the stud 4 and the sheet 6 in accordance with the adjustment of the arc. The process is therefore also particularly suitable for producing a steel sheet with a welded-on element, wherein the steel sheet surface has or has had a coating, in particular a lubricant layer or a zinc layer.

In general, the above identified embodiments are not to be construed as limiting the breadth of the present invention. It will be understood that modifications or other alternative constructions may become apparent within the scope of the invention as defined in the appended claims.

What is claimed is:

1. A lift-and-strike welding process comprising:
   a. cleaning a surface of a component by applying a first voltage so as to strike an arc between a stud, which is to be connected to the surface, and the surface;
   b. reversing the polarity of the first voltage wherein the stud is welded to the surface by at least one arc generated by a second voltage; and
   c. raising the stud a first distance above the surface for cleaning which is at least two times greater than a second distance the stud is raised for welding.

2. The process of claim 1 further comprising:
   setting the first voltage higher than a subsequent second voltage of reverse polarity.

3. The process of claim 2 further comprising:
   adjusting the first voltage to a positive polarity.

4. The process of claim 3 further comprising:
   coating the stud with a lubricant layer operable with a cold-forming machining operation prior to welding the stud onto the surface.

5. The process of claim 4 further comprising:
a. reducing the first voltage to a zero-current state;
b. using a pilot voltage of a different polarity at the start of the welding process; and
c. subsequently raising the voltage to a welding voltage thereafter.

6. The process of claim 5 further comprising:
maintaining the zero voltage for a predetermined period of time while a second voltage is building up and applying the second welding voltage.

7. The process of claim 6 further comprising:
a. an electric cleaning current flowing between a surface of the component and the stud welded thereon with the stud resting on the surface;
lifting the stud off the surface to an approximately constant distance for removing a coating from the surface through ignition of an arc as a cleaning agent;
b. changing the polarity of the current wherein, afterwards, at least one welding current is produced; and
c. welding the stud to the surface.

8. The process of claim 7 further comprising:
a. using a cleaning current of between 15 amperes and 500 amperes; and
b. reducing the cleaning current after the cleaning operation.

9. The process of claim 8 further comprising:
a. reversing the polarity of the current; and
b. applying a maximum welding current to weld the stud to the surface.

10. The process of claim 9 further comprising:
moving the stud into contact with the surface after disconnection of the welding current.

11. The process of claim 10 further comprising:
applying the cleaning current as long as or longer than the pilot current, which is applied prior to applying the welding current.

12. The process of claim 11 further comprising:
applying a welding current that is equal to or stronger than the cleaning current.

13. The process of claim 1 further comprising:
controlling the time period of the cleaning process by measuring the current at the surface.

14. A welding apparatus comprising:
a guide;
a control device for the guide;
a programmed device operable to control or regulate the electric current and the voltage used for cleaning and welding;
a welding voltage polarity reverser device operable with the programmed device to provide a cleaning current that has a polarity opposite that of the welding current that is produced prior to the welding operation; and
an evaluation device operable during cleaning to inspect the quality of cleaning.

15. The apparatus of claim 14 wherein:
the programmed device has a focusing device to produce an arc to be struck.

16. The apparatus of claim 14 wherein:
the polarity reversing device has a shorted circuit operably maintaining the struck arc during a reversal of the polarity.

17. The apparatus of claim 14 wherein:
the polarity reversing device has a circuit element; and
the circuit element produces an arc current that maintains the struck arc during the reversal of a polarity of the arc voltage.

18. The apparatus of claim 14 further comprising:
a first power source formed in the polarity reversing device to supply a cleaning current to the welding apparatus; and
a second power source formed in the polarity reversing device to supply a pilot current and a welding current to the welding apparatus.

19. The apparatus of claim 18 further comprising:
a coil connected to the second power source to maintain the struck arc during the reversal of the polarity.

20. The apparatus of claim 14 wherein:
the surface is aluminum; and
the surface has a lubricant coating placed thereon during its manufacture.

21. The claim 14 wherein:
the surface is steel sheet; and
the surface has a lubricant coating placed thereon during its manufacture.

22. A welding process comprising:
a. cleaning a surface of a component using a cleaning arc generated by a first voltage;
b. reversing a polarity of said first voltage to produce a second voltage that generates a welding arc; and
c. causing said first voltage to be greater than said second voltage.

23. The welding process of claim 22, further comprising:
welding an element to the component using said welding arc.

24. The welding process of claim 23, wherein the element is a welding stud.

25. The welding process of claim 23, further comprising:
coating the element with a lubricant layer for a cold-forming machining operation prior to said welding step.

26. The welding process of claim 23, wherein said cleaning step comprises cleaning the surface only in an area where the element is welded to the surface.

27. The welding process of claim 23, further comprising:
a. setting said first voltage to a zero-current state as the element is moved toward the surface;
b. contacting the element with the surface; and
c. lifting the element from the surface to ignite said welding arc.

28. The welding process of claim 22, wherein said cleaning arc is struck between the surface and an element to be welded to the surface.

29. The welding process of claim 22, wherein said first voltage has a positive polarity and said second voltage has a negative polarity.

30. The welding process of claim 22, wherein the component is aluminum.

31. The welding process of claim 22, wherein the component is a steel sheet.

32. The welding process of claim 22, further comprising:
a. reducing said first voltage to a zero-current state; and
b. reversing said polarity of said first voltage to produce said second voltage when said first voltage is at said zero-current state.

33. The process of claim 22, further comprising:
a. using a first voltage of between 15 amperes and 500 amperes; and
b. reducing said first voltage after said cleaning step.

34. The process of claim 22, further comprising:
raising the element to a predetermined first distance above the surface to perform said cleaning step that is at least two times greater than a second distance that the element is raised above the surface to perform said welding step.

35. The process of claim 22, wherein during said reversing step one of said first voltage and said second voltage continuously flows between the element and the surface such that one of said cleaning arc and said welding arc remains lit.

36. A process operable to weld an element to a component, the process comprising:
a. contacting the element to be welded to a surface of the component with the surface such that a first voltage flows between the element and the surface;
b. lifting the element from the surface to ignite a cleaning arc operable to clean the surface;
c. cleaning the surface with said cleaning arc;
d. recontacting the element to a surface of the component:
e. reversing a polarity of said first voltage to produce a second voltage such that said second voltage flows between the element and the surface;
f. lifting the element from the surface to ignite a welding arc capable of welding; and
g. welding the element to the surface using said welding arc.

37. The process of claim 36, wherein said first voltage is reduced to zero and said cleaning arc is extinguished before said reversing step.

38. The process of claim 36, wherein one of said first voltage and said second voltage continues to flow between the element and the surface during said reversing step such that one of said cleaning arc and said welding arc remains ignited during said reversing step.

39. The process of claim 36, wherein the element is brought into contact with the surface to generate said welding arc.

40. The process of claim 39, wherein the element is lifted to a first distance for cleaning during said lifting step occurring prior to said reversing step that is at least two times greater than a second distance that the element is lifted above the surface during said lifting step occurring subsequent to said reversing step.

41. The process of claim 36, wherein said first voltage is higher than said second voltage.

42. The process of claim 36, wherein said first voltage has a positive polarity and said second voltage has a negative polarity.

43. The process of claim 36, wherein said cleaning step comprises cleaning the surface only in an area where the element is welded to the surface.

44. A welding apparatus comprising:
a programmed device operable with a cleaning current and a welding current;
a polarity reversing device to provide said cleaning current and said welding current with opposite polarities; and
a coil connected to a power source to maintain an arc during operation of said polarity reversal device.

45. The apparatus of claim 44, further comprising a guide operable to guide said element into contact with said surface that said element is to be welded upon.

46. The apparatus of claim 45, wherein said guide guides said element into contact with said surface to produce a cleaning arc.

47. The apparatus of claim 45, wherein said guide guides said element into contact with said surface to produce a welding arc.

48. The apparatus of claim 44, further comprising a control device operating said guide.

49. The apparatus of claim 44, wherein said programmed device has a focusing device to produce an arc.

50. The apparatus of claim 44, wherein said cleaning current produces a cleaning arc operable to clean said surface.

51. The apparatus of claim 44, wherein said welding current produces a welding arc operable to weld said element to said surface.

52. The apparatus of claim 44, wherein said polarity reversing device produces a shorted circuit operable to maintain an arc as said cleaning current is terminated and said welding current is activated.

53. The apparatus of claim 44, wherein said cleaning current is positive and said welding current is negative.

54. The apparatus of claim 44, wherein said cleaning current is brought to a zero current state before said polarity reversing device converts said cleaning current to said welding current.

55. The apparatus of claim 44, wherein said cleaning current is powered by a first power source and said welding current is powered by a second power source that is different than said first power source.

56. A welding apparatus comprising:
a programmed device operable with a cleaning current and a welding current;
a polarity reversing device to provide said cleaning current and said welding current with opposite polarities; and
a first power source operable to provide said cleaning current and a second power source operable to provide said welding current.

57. The apparatus of claim 56, further comprising a guide operable to guide said element into contact with said surface that said element is to be welded upon.

58. The apparatus of claim 57, wherein said guide guides said element into contact with said surface to produce a cleaning arc.

59. The apparatus of claim 57, wherein said guide guides said element into contact with said surface to produce a welding arc.

60. The apparatus of claim 56, further comprising a control device operating said guide.

61. The apparatus of claim 56, wherein said programmed device has a focusing device to produce an arc.

62. The apparatus of claim 56, wherein said cleaning current produces a cleaning arc operable to clean said surface.

63. The apparatus of claim 56, wherein said welding current produces a welding arc operable to weld said element to said surface.

64. The apparatus of claim 56, wherein said polarity reversing device produces a shorted circuit operable to maintain an arc as said cleaning current is terminated and said welding current is activated.

65. The apparatus of claim 56, wherein said cleaning current is positive and said welding current is negative.

66. The apparatus of claim 56, wherein said cleaning current is brought to a zero current state before said polarity reversing device converts said cleaning current to said welding current.

67. The apparatus of claim 56, said apparatus further comprising:
- a coil connected to a power source to maintain an arc during operation of said polarity reversal device.

68. A welding apparatus comprising:
- a controller operable to provide a cleaning current and a welding current of opposite polarities; and
- a polarity reversing device having a circuit which produces an arc current and prevents the extinction of the arc when the current passes through zero and the polarity is reversed.

69. The apparatus of claim 68, further comprising a focusing device to produce an arc to be struck.

70. The apparatus of claim 68, wherein said polarity reversing device has a shorted circuit operably for maintaining the struck arc during a reversal of polarity.

71. A welding apparatus comprising:
- a controller operable to provide a first current for cleaning and a second current for welding;
- a polarity reverser operable to provide said first current with a polarity opposite of said second current; and
- an evaluator operable to inspect the quality of the cleaning.

72. The apparatus of claim 71 wherein:
- said evaluator measures a variation of the arc voltage or current in order to regulate the duration of cleaning.

73. The apparatus of claim 72 wherein:
- said evaluator communicates with said controller to terminate the cleaning operation.

74. The apparatus of claim 71 wherein:
- said evaluator communicates with said polarity reversing device to reverse polarity and initiate said second current for welding.

75. The apparatus of claim 71 further comprising:
- memory operably recording appropriate control parameters.

76. A welding apparatus comprising:
- a controller operable to provide a cleaning current and a welding current;
- a polarity reverser operable to provide said cleaning current with a polarity opposite of said welding current;
- a power source; and
- a conductor connected to said power source operable to maintain an arc during operation of said polarity reverser.

77. The apparatus of claim 76 wherein:
- alternating current flows through said conductor.

78. The apparatus of claim 77 wherein:
- said alternating current is controlled so that it influences an arc shape in such a way to clean only in the region to be welded.

79. The apparatus of claim 77 wherein said conductor is a coil which is operated with an alternating current between about 8 and 30 volts.

80. The apparatus of claim 76 wherein:
- a current intensity between about 0.1 and 0.2 amperes is used.

81. The apparatus of claim 76 further comprising:
- a collet operable to guide a weld-on element; and
- a housing surrounding said collet, around which said conductor is disposed.

* * * * *